United States Patent [19]

Weber et al.

[11] 4,163,275
[45] Jul. 31, 1979

[54] CONVERTER MEANS FOR VEHICLE LIGHT

[75] Inventors: Bernard R. Weber, Elm Grove; Brian A. Hanson, Hartford; Alton J. Cunningham, Slinger, all of Wis.

[73] Assignee: Wesbar Corporation, West Bend, Wis.

[21] Appl. No.: 826,174

[22] Filed: Aug. 19, 1977

[51] Int. Cl.² .............................................. B60Q 1/00
[52] U.S. Cl. ..................................... 362/80; 362/307; 362/372; 362/429
[58] Field of Search ............................... 362/61, 80–83, 362/307, 253, 362, 64, 71, 371, 372, 429; 40/129 C; 340/84, 87

[56] References Cited

U.S. PATENT DOCUMENTS

| 3,302,059 | 1/1967 | Haire | 362/221 |
| 3,789,209 | 4/1974 | Weber | 362/253 |
| 3,831,018 | 8/1974 | Weber | 362/307 |

Primary Examiner—Benjamin R. Padgett
Assistant Examiner—Josephine L. Barr
Attorney, Agent, or Firm—James E. Nilles

[57] ABSTRACT

Converter means for converting a side marker light for a vehicle such as a trailer to a combination side marker and clearance light comprises an adapter assembly for repositioning the ligh bulb and a multi-sided translucent lens for replacing the original flat lens of the side marker light.

11 Claims, 9 Drawing Figures

CONVERTER MEANS FOR VEHICLE LIGHT

BACKGROUND OF THE INVENTION

1. Field of Use

This invention relates generally to side marker lights, clearance lights, and combination clearance and side marker lights for vehicles such as trailers, recreational vehicles and the like. In particular, it relates to converter means for converting a side marker light to a combination side marker and clearance light.

2. Description of the Prior Art

Federal, state and local regulations and industry standards require vehicles, including trailers, to have lights of specified light emitting characteristics and color to be located at specified positions to provide prescribed lighting signals and functions. U.S. Pat. No. 3,831,018 issued Aug. 20, 1974 to Weber and assigned to the same assignee as the present application identifies and briefly outlines some of these DOT and SAE regulations and standards and discloses a multi-purpose vehicle light which has a four-sided light emitting lens and is usable, for example, as a side marker light, a clearance light, a combination side marker and clearance light, or an identification light. U.S. Pat. No. 3,789,209 issued Jan. 29, 1974 to Weber et al and assigned to the same assignee as the present application discloses a vehicle tail light which has a built-in side marker light and employs a flat lens for light emission chiefly in one direction.

Briefly stated, clearance lights are those of a specified lens color which show to the front or rear of a vehicle, and are mounted on the permanent structure of the vehicle as near as practical at the right and left front sides and right and left rear sides at extreme width to indicate the overall width and height of the vehicle. Side marker lights are those of a specified lens color which show to the side of the vehicle and are mounted as near as practical at the front and rear on both sides of a trailer frame to indicate the overall length of the vehicle. Combination clearance and side marker lights are single lights which simultaneously fulfill the requirements of clearance and side marker lights.

In practice, both side marker lights and clearance lights typically comprise a molded plastic recessed mounting base having a bulb support within the recess, a bulb mounted on the support, and a lens of appropriate color and shape releasably secured to the mounting base and overlying the bulb. Typically, the lens which may be flat or multi-sided, depending on use, embodies interiorly molded surface projections to enhance light emission and dispersion therefrom or to provide a reflex reflector surface or both.

It is desirable from the standpoint of simplicity and economy in manufacture and inventory control to be able to substitute one type of light for another. However, each type of light is designed and constructed to meet the physical configuration and photometric requirements dictated by its particular application either as clearance, side marker, or combination clearance and side marker light and, as a result, such substitution is not usually possible. For example, lens configuration and construction often differ. Also, bulb location within various types of lights may differ. Thus, one type of side marker light employs a flat lens from which light is emitted in substantially one direction and it cannot, therefore, be employed as a substitute for another type of light, such as a side-mounted clearance light, which employs a multi-sided lens whereby light is emitted from the sides and the end of the lens. On the other hand, even in cases where a flat lens on a side marker light can physically be replaced by a multi-sided lens, the light bulb may be in the wrong location relative to the replacement lens and photometric requirements cannot be met for both side marker and clearance lights. In addition, the location of the integrally formed reflex reflector surface embodied in some lens may interfere with the photometric requirements for a clearance light even if the light bulb is in an appropriate location. Accordingly, it is desirable to provide converter means whereby one type of vehicle light, such as a conventional prior art side marker light, can be converted to another type of light, such as a combination side marker and clearance light.

SUMMARY OF THE PRESENT INVENTION

In accordance with the present invention, converter means are provided to convert a prior art type of side marker light for a trailer or other vehicle to a combination side marker and clearance light meeting all appropriate legal and technical photometric requirements and standards.

The prior art side marker light which is to be converted may take the form of an independent surface-mounted unit attachable to a trailer or it may be embodied or incorporated, for example, in a tail light housing which is attachable to a trailer. In either case, the prior art side marker light to be converted comprises, for example, a mounting base having a recess therein defined by an outwardly projecting flange; a bulb; a bulb support means within the recess for physically holding the bulb in a predetermined position and having electric contacts for electrically connecting the bulb to an electric power source on the vehicle and to the vehicle ground; and a flat translucent reflex reflector type lens releasably connectable to the base and overlying the recess and the bulb therein.

The converter means in accordance with the invention for converting the aforedescribed prior art type of side marker light to a combination side marker and clearance light generally comprises an adapter assembly and a replacement lens.

The adapter assembly comprises an adapter bracket, a bulb socket mounted on the adapter bracket by means of a riveted or welded angle bracket, a replacement bulb for insertion in the bulb socket, a flexible insulated wire lead having one end connected to one terminal of the bulb socket, and a connector attached to the other end of the wire lead and supported on the adapter bracket. The adapter assembly is assemblable to the bulb support means in the recess of the mounting base of the prior art side marker light in place of the original bulb. The adapter assembly serves to support a replacement bulb in a different physical position than the original bulb so that photometric requirements are met, i.e., beyond the edge of the flange and near one corner of the recess on the mounting base, and also electrically connects the replacement bulb to the electric contacts for the original bulb.

The replacement lens takes the form of a four-sided translucent lens releasably connectable to the mounting base in place of the original flat lens. The replacement lens has an integrally formed light dispersion and reflex reflector area in the end wall of the lens but such area does not overlie the replacement bulb. Thus, the replacement lens is designed and constructed so as to take into account the location of the replacement bulb relative thereto so that required photometric requirements for combination side marker and clearance lights are met.

The converter means in accordance with the invention offer numerous advantages. For example, prior art side marker lights previously limited to one application can be easily, economically, and quickly converted to combination side marker and clearance lights either during manufacture or in the field by dealers or end-users. Thus, the number of different types of vehicle lights which need to be manufactured and stocked can be reduced and the converter means can be manufactured and made available as a low-cost kit. The converter means are relatively economical to manufacture, easy to install in factory or field, are reliable in operation when installed on vehicles, and meet all regulatory and photometric requirements. Other objects and advantages of the invention will hereinafter appear.

DESCRIPTION OF PREFERRED EMBODIMENTS

Figure 1:
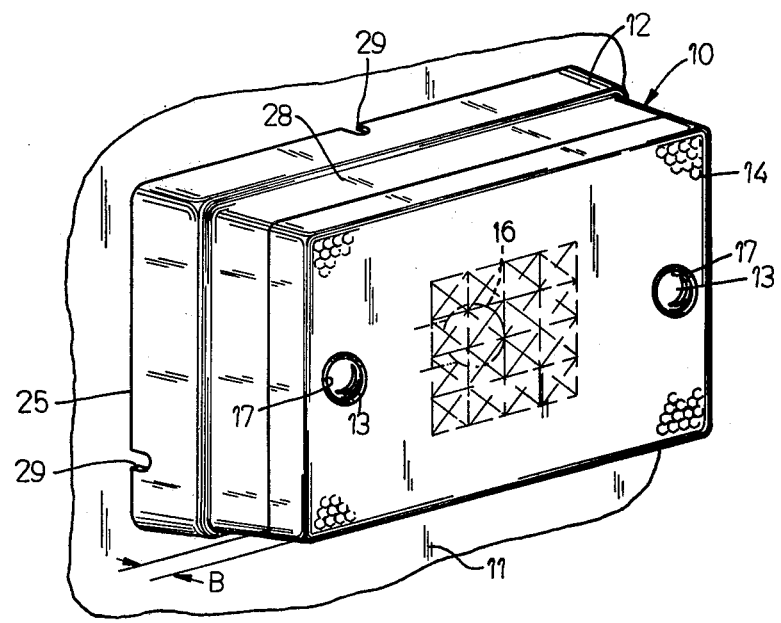
FIG. 1 is a perspective view of a prior art side marker light.
Figure 3:
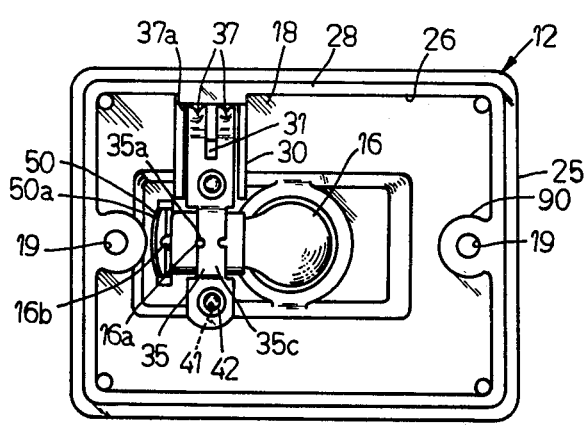
FIG. 3 is a plan view of the front of the side marker light mounting base shown in FIG. 1 with the lens removed.
Figure 4:
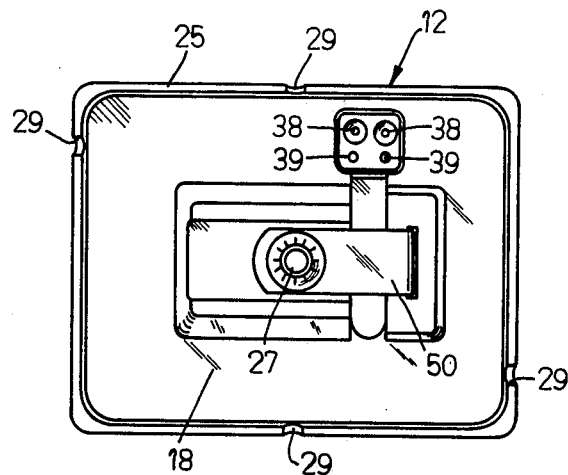
FIG. 4 is a plan view of the rear of the mounting base shown in FIG. 3.

FIG. 1 shows a prior art side marker light 10 mounted on the side 11 of a trailer or other vehicle. Light 10 may take the form of an independent surface mounted unit, as shown in FIG. 1, or may be embodied or incorporated in a tail light housing (not shown) of the type disclosed in U.S. Pat. No. 3,789,209. In either case as FIGS. 1, 3, and 4 show, light 10 generally comprises a molded plastic mounting base 12 having a recess 26 therein defined by a rectangular outwardly projecting flange 28; a bayonet-type light bulb 16; bulb support means within recess 26 for physically holding the bulb in a predetermined position and having electric contacts 35 and 50 for electrically connecting the bulb to an electric power source and to the vehicle ground; and a molded plastic flat rectangular translucent reflex reflector and side marker lens 14 which is releasably connectable to flange 28 by the two attachment screws 13 which extend through holes 17 in the lens and screw into threaded holes 19 in the mounting base and which overlies the recess 26 and the bulb 16 therein.

Base 12 comprises a rear wall 18 having a mounting hole 20 therethrough for receiving a press-fitted mounting and grounding bolt 27 which enables physical connection of the base to an appropriate place on the vehicle and also provides a ground connection. The base 12 further comprises an integrally formed continuous rearwardly extending flange 25 which has wire accommodating holes or slots 29 at its rear edge.

The bulb support means in recess 26 of base 12 comprise an integrally molded projection 30 which extends from rear wall 18. The top surface 31 of projection 30 is provided with a semi-circular cutout 32 having a semi-circular shoulder 32a along its edge for accommodating the bayonet base of bulb 16. The ends of shoulder 32a terminate just below surface 31 to afford clearance for the bayonets of bulb 16 when the latter is inserted or removed. The bulb support means further comprise the contact strap 35, which is preferably formed by punching from electrically conductive resilient sheet metal, and rigidly secured to the surface 31 of projection 30 for engagement with the terminal 16a of bulb 16. Strap 35, which has a semi-circular mid-section 35c and flat ends, is provided with two holes 41 in its flat ends for accommodating two pins 42, integrally formed on top surface 31 of projection 30. The pins 42, when deformed as by ultrasonic welding or hydraulic upsetting, rigidly secure strap 35 to surface 31. Strap 35 is also provided with a notch 35a for releasable engagement with one of the bayonets of bulb 16 to hold the bulb in place after its base is inserted in the cylindrical opening formed by semi-circular cutout 32 and curved section 35c of strap 35. The other bayonet of bulb 16 bears against a side of shoulder 32a. Strap 35 is provided at one flat end with two push-in-type wire-engaging terminals 37 which cooperate with a side wall 37a, and are accessible through wire insertion ports 38 in base 12 by wires (not shown) inserted from the rear of base 12 to connect strap 35 to an electric power source such as a vehicle battery or alternator (not shown). Wire release ports 39 are located adjacent the wire insertion ports 38 to admit a tool for disengaging the wire (not shown) from the terminals 37. The bulb support means position the globe of bulb 16 substantially over the center point of base 12 and below the edge of flange 28. The generally L-shaped electrical ground connector contact strap 50 is secured to base 12 by bolt 27 and electrically connects the bulb base terminal 16b of bulb 16 to bolt 27. Strap 50 is provided with a bolt mounting hole 52 for accommodating bolt 27. Strap 50 has a resiliently movable leg 50a for making electrical connection with the bulb base terminal 16b and for biasing the bulb into firm engagement with strap 35 of the bulb support means.

Figure 2:
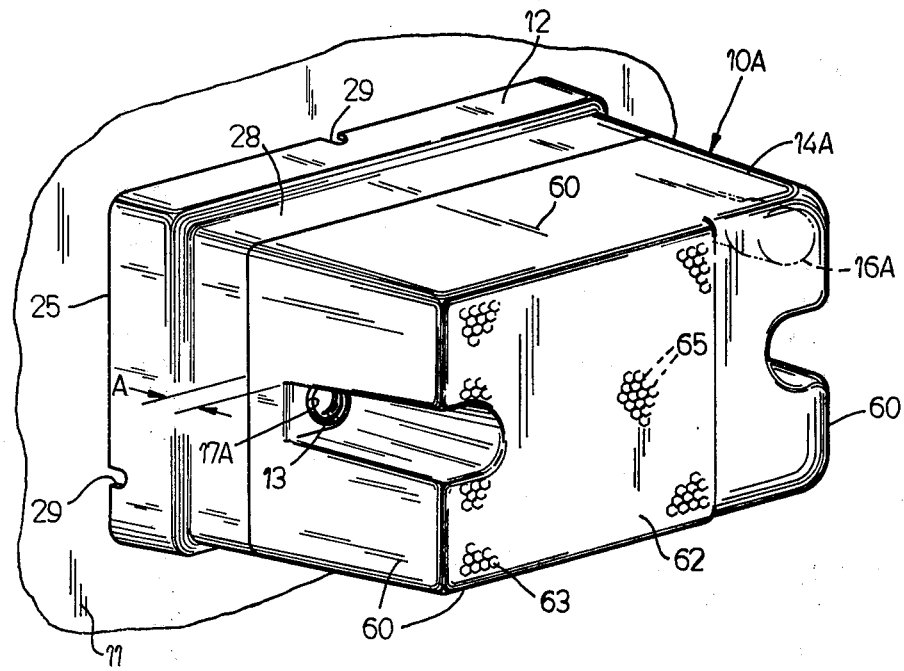
FIG. 2 is a perspective view of a combination side marker and clearance light which has been converted from the side marker light shown in FIG. 1 by converter means in accordance with the present invention.

In accordance with the present invention, converter means are provided for converting the side marker light 10, shown in FIG. 1, to a combination side marker and clearance light 10A, shown in FIG. 2. The converter means generally comprises an adapter assembly 70, shown in FIGS. 5, 6, 7, and 8, and a replacement lens 14A, shown in FIGS. 2, 6, 7, and 9.

The adapter assembly 70 comprises an electrically conductive stamped sheet metal adapter bracket 72, a commercially available wedge-base-type bulb socket 74 mounted on the adapter bracket by means of an electrically conductive L-shaped stamped sheet metal angle bracket 75, a commercially available wedge-base replacement bulb 16A for insertion in the bulb socket 74, a flexible insulated wire lead 76 having one end connected to one bulb socket terminal 81 of bulb socket 74, and a connector 77, insulated by a molded shield 78, attached to the other end of the wire lead 76 and supported on the adapter bracket 72. An electrically conductive rivet 79 mechanically connects the insulating base 80 of bulb socket 74 to angle bracket 75 and also electrically connects the other bulb socket terminal 82 to the angle bracket 75. An electrically conductive rivet 83 connects angle bracket 75 to adapter bracket 72.

Figure 5:
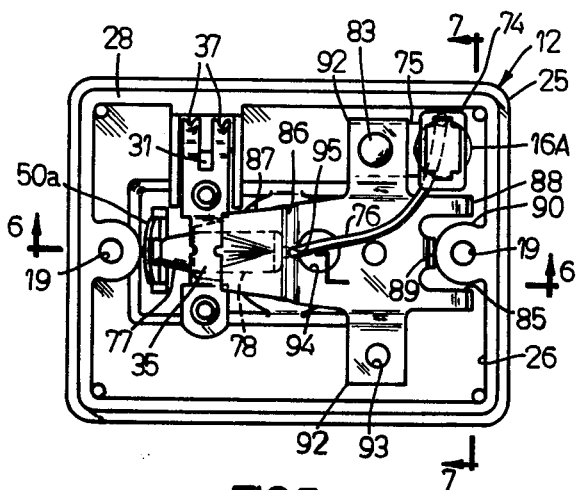
FIG. 5 is a plan view of the front of the mounting base shown in FIGS. 1, 2, and 3 with an adapter assembly in accordance with the invention employed therein instead of the original bulb shown in FIG. 3.

The adapter assembly 70 is connectable to the bulb support means on base 12 in place of the original bulb 16, as FIG. 5 shows. The adapter assembly 70 serves to physically support the replacement bulb 16A in a different position than the original bulb 16, i.e., beyond the edge of the flange 28 (see FIGS. 6 and 7) and near one corner of the recess 26 on mounting base 12 (see FIG. 5). The adapter assembly 70 also electrically connects the two electric contact straps 35 and 50 of base 12 to the terminals 81 and 82, respectively, of bulb socket 74.

Figure 6:
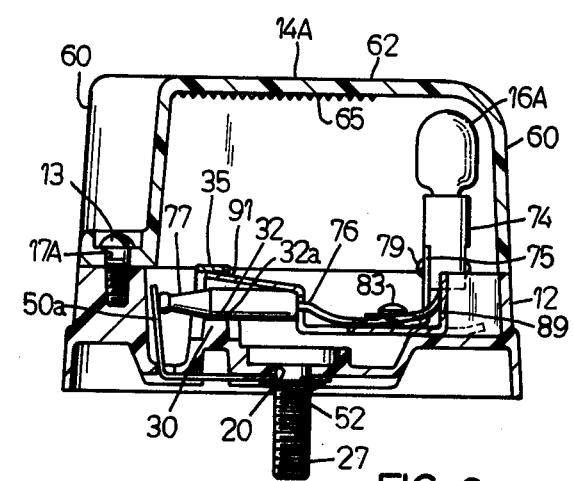
FIG. 6 is a cross-sectional view taken on line 6—6 of FIG. 2.
Figure 7:
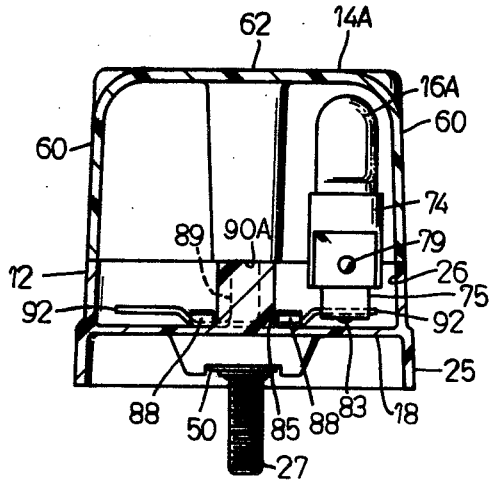
FIG. 7 is a cross-sectional view taken on line 7—7 of FIG. 2.
Figure 8:
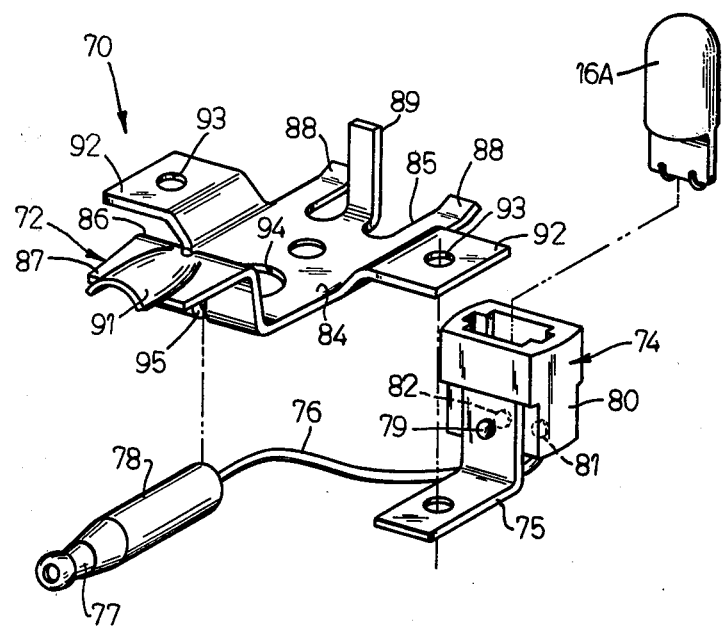
FIG. 8 is an enlarged exploded perspective view of the adapter assembly shown in FIG. 5.
Figure 9:
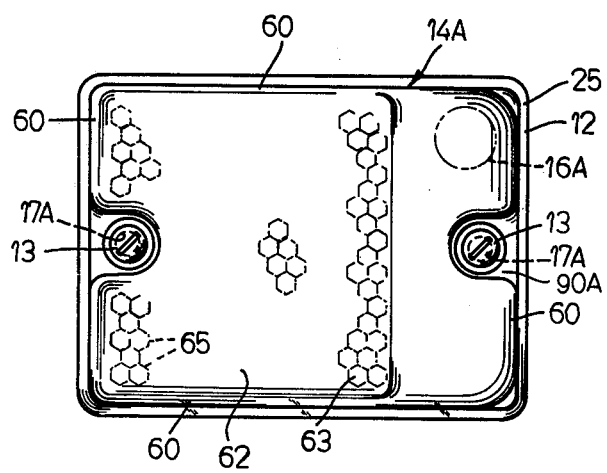
FIG. 9 is a front elevation view of the light shown in FIG. 2.

As FIG. 8 shows, adapter bracket 72 comprises a flat main section 84 having outwardly extending flanges 92 at its opposite side edges, a recess 85 at one edge, and an upwardly extending mid-section 86 at an opposite edge from which an end section 87 extends. Recess 85 is bounded by two legs 88 and an upwardly extending leg 89 and, when in place on base 12, accommodates a projection 90 at one end of recess 26 and bears thereagainst, as hereinafter explained. The flanges 92 each have a rivet hole 93 therein for accommodating a rivet such as 83 which secures the angle bracket 75 thereto. Thus, either flange 92 can be chosen for use with the angle bracket 75. End section 87 has an integrally formed curved section 91 which complements the curvature of semi-circular mid-section 35c of strap 35. The main section 84 has an opening 94 which communicates with a wire-receiving slot 95 in upwardly extending mid-section 86. The slot 95 accommodates wire lead 76 which slips thereinto as shown in FIGS. 5 and 8. Thus, the connector 77 is disposed beneath the end section 87 and its molded shield 78 abuts the face of upwardly extending mid-section 86, as FIGS. 5 and 6 show.

The adapter assembly 70 is attachable as follows to base 12 when the original bulb 16 is removed therefrom. Thus, the curved section 91 is slipped beneath and engages the semi-circular mid-section 35c of strap 35, the connector 77 is forced against the resilient leg of strap 50, and the adapter bracket 72 is then pressed down toward the bottom of the recess 26 in base 12. The recess 85 in adapter bracket 72 accommodates the integrally formed projection 90 in base 12. As FIG. 6 makes clear, the biasing action of resilient strap 50 against the end of connector 90 forces the molded shield 78 on connector 77 against the upwardly extending mid-section 86 of adapter bracket 72. The effect of this is to maintain the connector 77 in proper position and in good electrical contact with strap 50 and to force the upwardly extending leg 89 of adapter bracket 72 firmly against the projection 90 on base 12. The legs 88 on main section 84 of adapter bracket 72 prevent the adapter assembly 70 from being laterally displaced. When the adapter assembly 70 is thus disposed in base 12, as shown in FIG. 5, an electrical circuit exists from contact 50 through connector 77, wire lead 76, through bulb socket terminal 81 to one terminal of replacement bulb 16A. An electrical circuit also exists from terminal 35, through adapter bracket 72, through angle bracket 72, through bulb socket terminal 82 to the other terminal of bulb 16A.

The replacement lens 14A takes the form of a four-sided translucent lens which is releasably connectable to the base 12 in place of lens 14 by means of the screws 13 which extend through the holes 17A in lens 14A and screw into the threaded holes 19 in mounting base 12. Lens 14A is preferably fabricated by molding from translucent plastic of a suitable color for desired signal purposes. The color must meet federal code-DOT 108, hereinbefore referred to. As FIGS. 6 and 2 show, the thickness A of the portion of lens 14A through which a screw 13 extends is the same as the thickness B of flat lens 14. Thus, the same screws 13 can be employed for conversion. The replacement lens 14A is designed and constructed so as to take into account the location of the replacement bulb 16A relative thereto so that photometric requirements for a combination side marker and clearance light are met. Assembly 72 is also held in position by the projection or shoulder 90A surrounding a mounting hole 17A in lens 14A, which engages the upper end of leg 89. The lens 14A comprises four substantially flat, slightly sloped side walls 60 and an integrally formed flat face or end wall 62, with light dispersion and reflex reflector means 63 integrally formed on one area of the inner surface of the face 62. Lens 14A is designed and constructed so that light from bulb 16A is visible from all four side walls 60 and from face 62. Thus, both the inner and outer surfaces of each of the flat side walls 60 are smooth and virtually transparent. Similarly, the outer surface of face 62 is smooth and virtually transparent. The inner surface of face 62 is also smooth except for that region or area occupied by the reflex reflector prism means 63.

The region or area of inner surface of face 62 defining the reflector means 63 is provided with multi-facetted projections 64 which, as FIGS. 2, 6, 7, and 9 show, are arranged in rows and result in the formation of a plurality of light dispersing reflective surfaces 65 defining the reflex reflector means 63.

With regard to photometric requirements for lens 14A, it should be understood that light emanating from replacement bulb 16A is visible through a range of 180° in a horizontal plane and is visible through a range of 180° in a vertical plane. Thus, the combined side marker and clearance light shown in FIG. 2, when properly mounted on a trailer or other vehicle, is visible from the side and front or rear of the vehicle on which it is mounted, depending on whether the combination side marker and clearance light is mounted at the front of the trailer (yellow being the approved color) or at the rear of the trailer (red being the approved color).

The side marker light 10 disclosed herein is adapted to be mechanically secured to and electrically grounded to a vehicle by means of a bolt 27. However, it is to be understood that the present invention is applicable to other types of side marker lights which, for example, have other means for securing and electrically connecting the light to a vehicle.

We claim:
1. In a vehicle light:
 a base;
 first means on said base for supporting a bulb in a predetermined position relative to said base and having contact means for electrically connecting said bulb for energization from a power source remote from said base;
 and converter means including an adapter assembly releasably connected to said first means in place of a bulb for supporting a bulb in a different location than said predetermined location and for electrically connecting said last-recited bulb for energization from said contact means, said adapter assembly comprising an electrically conductive support bracket engageable with said contact means and said base, a bulb socket mounted on said support bracket, and a conductor connected between said bulb socket and said contact means.

2. A vehicle light according to claim 1 wherein said converter means includes a lens connected to said base and overlying said adapter assembly.

3. In a vehicle light:

a base;

first means on said base for supporting a bulb in a predetermined position relative to said base and having a pair of contacts for electrically connecting said bulb for energization from a power source remote from said base;

and converter means including an adapter assembly releasably connected to said first means in place of a bulb for supporting a bulb in a different location than said predetermined location and for electrically connecting said last-recited bulb for energization from said pair of contacts, said adapter assembly comprising an electrically conductive support bracket engageable with one of said pair of contacts and with said base;

a bulb socket mounted on said support bracket for supporting a bulb in said different location, said bulb socket having a pair of bulb socket terminals thereon, one of said bulb socket terminals being electrically connected to said support bracket;

and a conductor connected between the other of said bulb socket terminals and the other of said pair of contacts of said first means.

4. A vehicle light according to claim 3 wherein said converter means includes a lens connected to said base and overlying said adapter assembly.

5. Converter means for converting a side marker light for a vehicle to a combination side marker and clearance light;

said side marker light comprising a mounting base and bulb support means, including contact means, for physically holding a bulb in a predetermined position and for electrically connecting said bulb for energization from a power source remote from said base;

said converter means comprising an adapter assembly;

said adapter assembly being electrically and mechanically connectable to said bulb support means and serving to support a bulb in a different position than said predetermined position, said adapter assembly comprising an electrically conductive support bracket engageable with said contact means and said mounting base, a bulb socket mounted on said support bracket, and a conductor connected between said bulb socket and said contact means.

6. Converter means according to claim 5 further including a replacement lens connectable to said mounting base and constructed so as to overlie a bulb in said different position.

7. Converter means according to claim 5 wherein said electrically conductive support bracket is engagable with said base and with one electrical contact of said contact means on said base;

wherein said bulb socket has a pair of bulb socket terminals and one of said bulb socket terminals is electrically connected to said support bracket;

and wherein said conductor comprises a wire lead having one end connected to the other bulb socket terminal and having a connector at its other end for engagement with another electrical contact of said contact on said base.

8. Converter means for converting a side marker light for a vehicle to a combination side marker and clearance light;

said side marker light comprising:

a mounting base having a recess therein;

an original bulb;

a bulb support means within the recess for physically holding said original bulb in a predetermined position in said recess and having a pair of electric contacts for electrically connecting said original bulb for energization from a power source remote from said base;

and a flat lens releasably connectable to the base and overlying the recess and the bulb therein;

said converter means comprising an adapter assembly and a replacement lens;

said adapter assembly comprising an electrically conductive adapter bracket engagable with one of said electrical contacts and said mounting base and a bulb socket on said adapter bracket for a replacement bulb, and means for electrically connecting said pair of electrical contacts of said bulb support means to said bulb socket;

said adapter assembly serving to support said replacement bulb in a physical position above said recess and to electrically connect said replacement bulb to said electric contacts for said original bulb;

said replacement lens connectable to said mounting base in place of said original flat lens and constructed so as to accommodate the location of said replacement bulb relative thereto.

9. Converter means according to claim 8 wherein said adapter bracket is electrically connected to one of said pair of contacts on said base, wherein said bulb socket for said replacement bulb has a pair of terminals, one terminal of said bulb socket being electrically connected to said adapter bracket, and wherein said means for electrically connecting said pair of electrical contacts of said bulb support means comprises a flexible insulated wire lead having one end connected to the other terminal of said bulb socket, and an insulated connector attached to the other end of said wire lead and supported on said adapter bracket and electrically connected to the other of said pair of contacts on said base.

10. Converter means according to claim 8 wherein said replacement lens takes the form of a four-sided translucent lens releasably connectable to the mounting base in place of the original flat lens;

said replacement lens having an integrally formed light dispersion and reflex reflector area in the end wall thereof and adjacent the area which overlies said replacement bulb.

11. Converter means according to claim 8 wherein said replacement lens engages said adapter assembly to aid in preventing displacement thereof when said replacement lens is connected to said base.

* * * * *